April 22, 1941.   T. B. ADAMS   2,239,212
KNITTING DEVICE
Filed Oct. 23, 1939   3 Sheets-Sheet 2

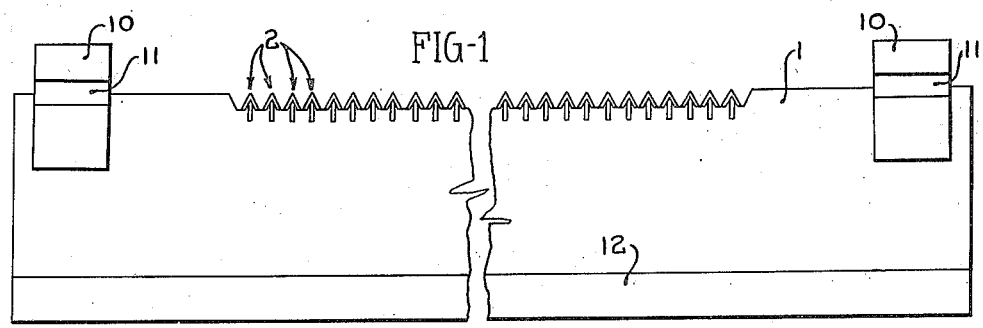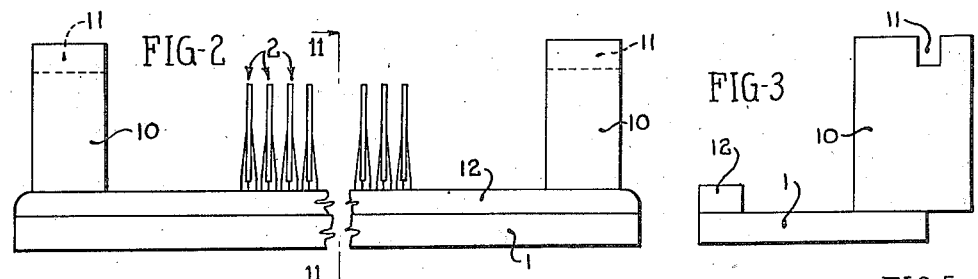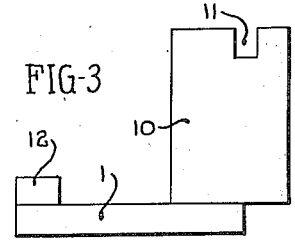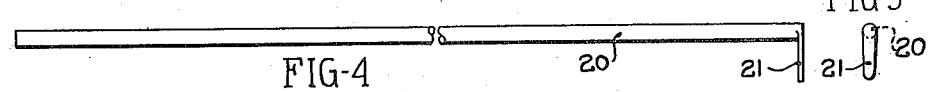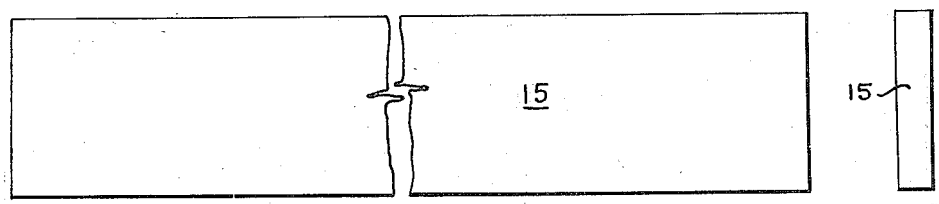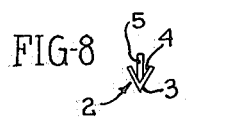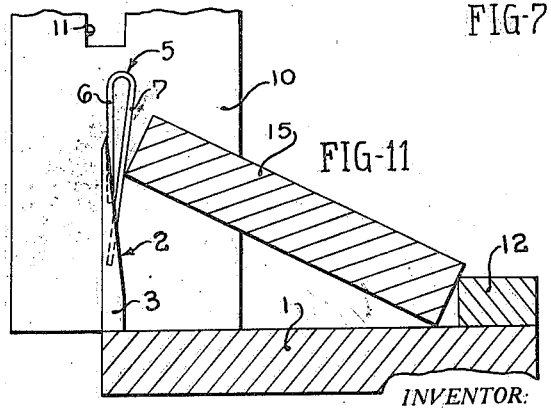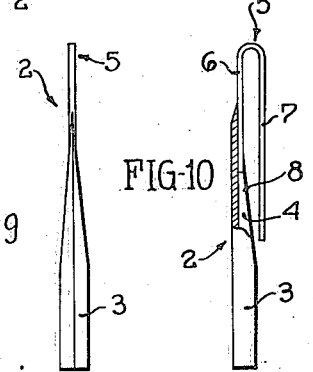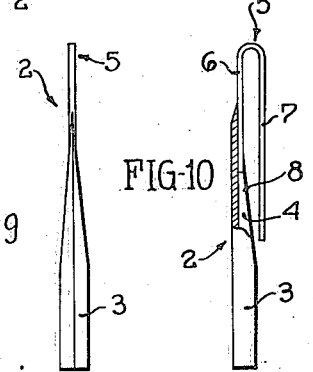

INVENTOR:
Thomas B. Adams
BY
ATTORNEY.

April 22, 1941.  T. B. ADAMS  2,239,212
KNITTING DEVICE
Filed Oct. 23, 1939  3 Sheets-Sheet 3
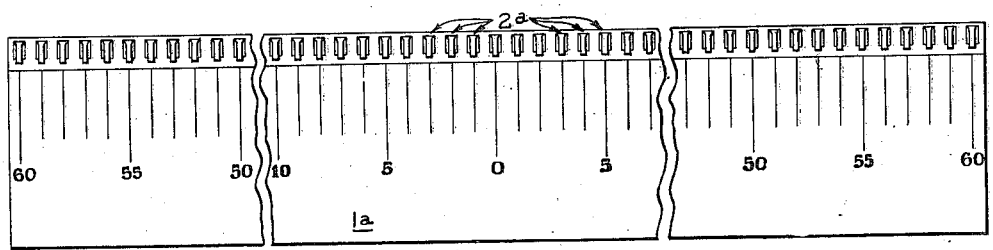
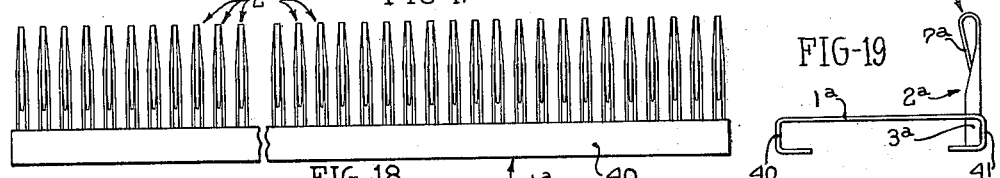
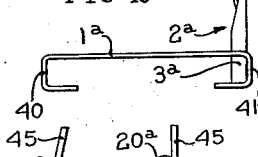
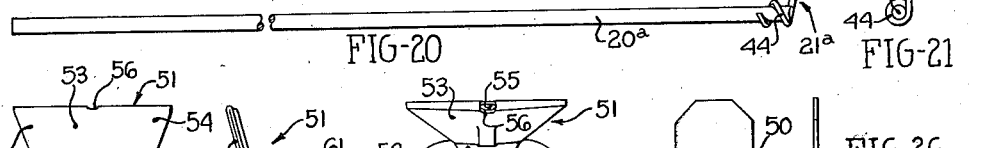
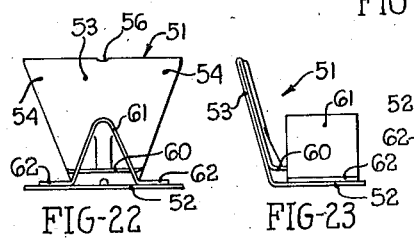
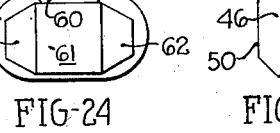
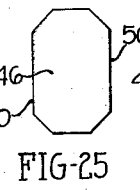
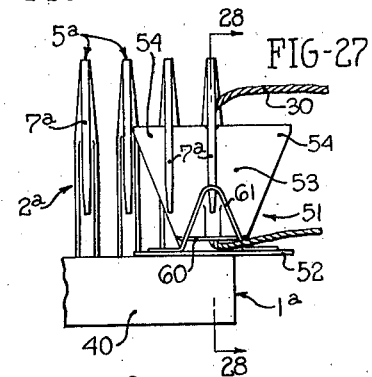
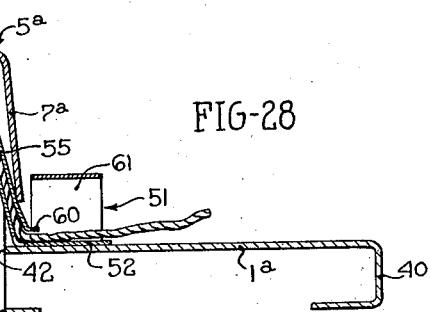
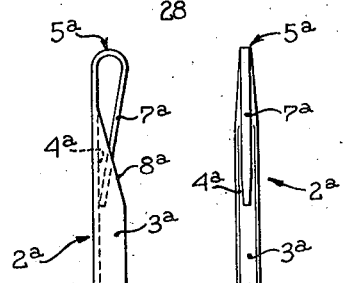
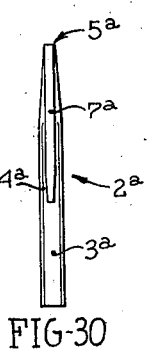
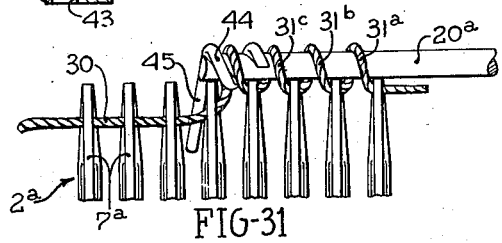
INVENTOR:
Thomas B. Adams
BY
ATTORNEY.

Patented Apr. 22, 1941

2,239,212

UNITED STATES PATENT OFFICE 2,239,212

KNITTING DEVICE

Thomas B. Adams, Quincy, Ill.

Application October 23, 1939, Serial No. 300,693

12 Claims. (Cl. 66—1)

The present invention relates to knitting devices, and has for its object the provision of an improved device by the use of which hand knitting may be accomplished with ease and speed without any particular skill being required of the user.

This invention is a continuation in part of my co-pending application, Serial No. 220,651, filed July 22, 1938, and is described in detail in the following specification, reference being had to the appended drawings. One embodiment of my invention is shown in Figs. 1–16, inclusive, in which:

Figs. 1, 2 and 3 are top, front and end views, respectively, of the frame of my improved knitting device;

Figs. 4 and 5 are side and end views, respectively, of the needle comprising another part of my knitting device;

Figs. 6 and 7 are top and end views, respectively, of the presser board comprising another part of my knitting device;

Figs. 8, 9 and 10 are enlarged top, rear and side views of one of the knitting pins on the frame;

Fig. 11 is an enlarged cross-sectional view taken along the line 11—11 of Fig. 2.

Figure 12:
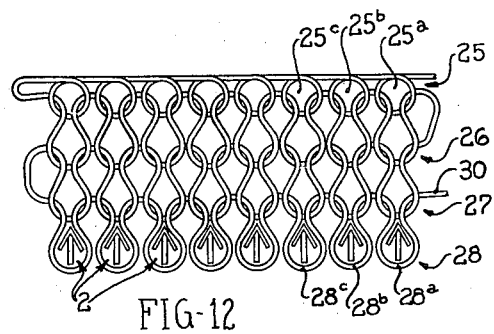
Figs. 12 to 16, inclusive, illustrate the use of my improved knitting device in performing the steps in knitting one row of stitches.

Another embodiment of my invention is illustrated in Figs. 17–31, inclusive, in which:

Figs. 17, 18 and 19 are top, front and end views, respectively, of the frame of the modified form of my improved knitting device;

Figs. 20 and 21 are side and end views, respectively, of the needle comprising another part of this embodiment of my knitting device;

Figs. 22, 23 and 24 are enlarged front, end and top views, respectively, of the shuttle device comprising another part of this embodiment of my invention;

Figs. 25 and 26 are front and side views, respectively, of a needle rest adapted to be inserted between the knitting pins when the needle is being used;

Fig. 27 illustrates the use of the shuttle device in threading the yarn through the knitting pins;

Fig. 28 is a sectional view taken along the line 28—28 in Fig. 27;

Figs. 29 and 30 are enlarged side and front views, respectively, of one of the knitting pins on the frame of the modified knitting device; and Fig. 31 illustrates the use of the needle in one step of the process of knitting a row of stitches.

Referring now to the drawings, and more particularly to Figs. 1–16, inclusive, the frame of my knitting device comprises an elongated base 1 having a plurality of spaced, vertically positioned knitting pins 2 disposed along the rear edge of the base. Each pin comprises a pedestal 3, angular in cross-section to form a trough or recess 4 in its front face, and an inverted U-portion 5, one leg 6 thereof being fixed to the upper end of the pedestal 3 in the recess 4 thereof. The U-portion 5 of the pin is made of flexible material, so that the free leg 7 thereof may be flexed into recess 4 to conceal the end thereof for a purpose to be described hereinafter. The sides of the pedestal 3 of the pins are tapered toward the fixed leg 6 of the loop, as shown at 8. The pins 2 are positioned on the base 1 with the U-portions thereof extending toward the front side of the base.

On each end of the base 1, a vertically positioned standard 10 is fixed. These standards are provided with slots 11 extending in the direction of the length of the base and in the plane of the knitting pins 2. Along the front edge of base 1, on the top face thereof, an anchor strip 12 is provided.

My device also includes a presser board 15 which is of a width such that when the presser board is disposed with one side against the rear edge of the strip 12, the other side will contact the free legs 7 of the knitting pins. By exerting downward pressure on the presser board, when so positioned, the free legs 7 of the knitting pins may be pressed into the recess 4 in the pedestals of the pins, as shown in Fig. 11, to conceal the ends of legs 7. Presser board 15 is made of a length somewhat longer than the space occupied by the knitting pins but short of the distance between standards 10.

My device further includes a needle 20 which comprises an elongated bar, preferably circular in cross-section. Needle 20 is provided with a finger 21 at one end extending at right angles to the needle.

Figure 13:
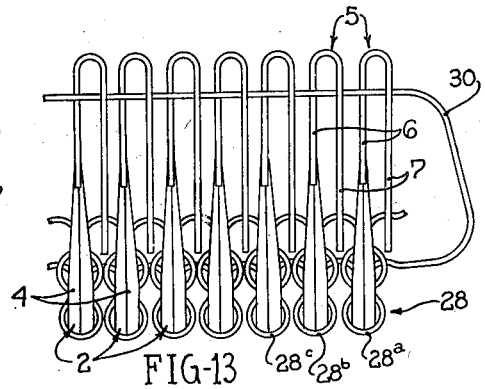
Figure 14:
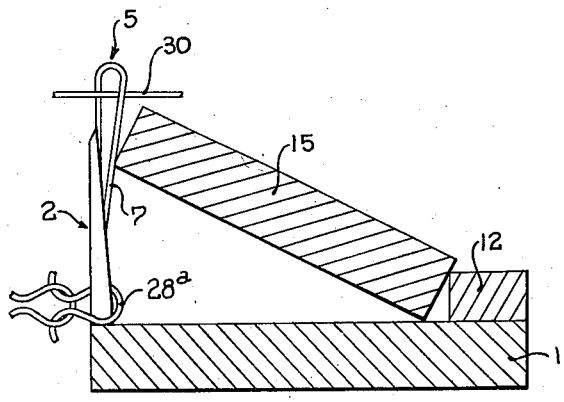
Figure 15:
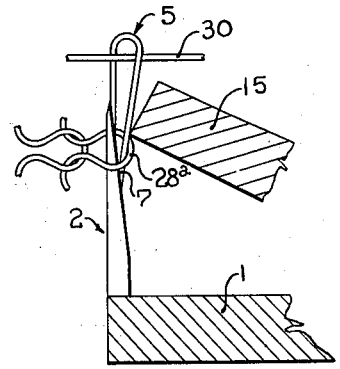
Figure 16:
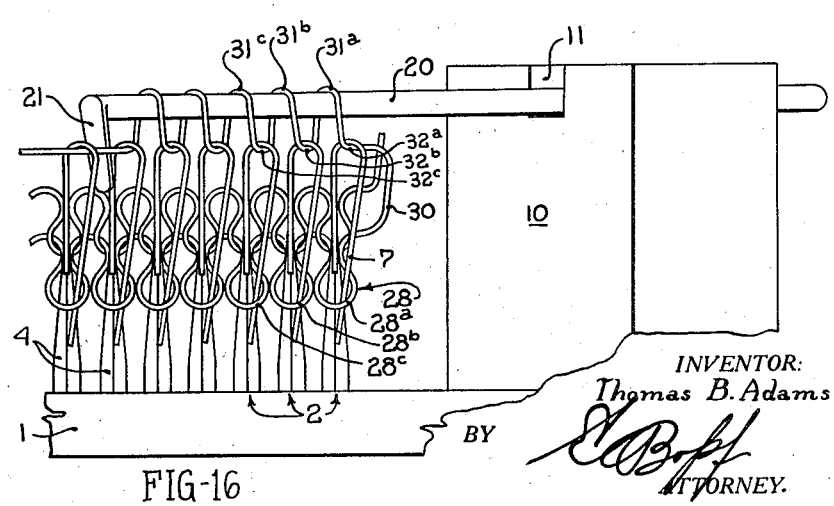

To start a piece of knitting work, the first row of stitches 25 are formed by merely winding a loop 25a, b, c, etc. around each knitting pin successively. Thereafter, each successive row of stitches is formed as will now be described. In Fig. 12, a section of knitting work is illustrated, rows of stitches 25, 26, 27 and 28 having been previously formed, the last formed row of stitches 28 being on the knitting pins 2. To form the next row, the free end 30 of the yarn is first fed under the U-portions 5 of the knitting pins, as is shown in Fig. 13. Then the free legs 7 of the U-portions of the knitting pins are pressed into the recesses 4 to conceal the ends thereof, by the use of the presser board 15, as previously described and as shown in Figs. 11 and 14. Then the stitches of row 28 disposed upon the knitting pins are raised upon the pins over the leg 7 of the pins, as shown in Fig. 15. The presser board may then be removed. Next, loops 31a, b, c, etc. are progressively formed between each pair of knitting pins 2 by winding a turn of yarn upon the needle 20 between each pair of pins, by rotating the needle, the finger 21 on the needle 20 serving to picking up the yarn and place it upon the needle, as is illustrated in Fig. 16. This operation is begun at the end of the free portion of the yarn attached to the completed work, and during this operation the yarn for making the loops is allowed to feed in from the opposite end. In the performance of this operation, the needle 20 can be rested in the slot 11 of the adjacent standard 10, to facilitate the rotation thereof. Thereafter, the needle is withdrawn and the stitches of row 28 are pulled up over the top of the U-portion of the pins and then the loops 32a, b, c, etc. on the pins between the loops 31a, b, c, etc. are pushed down the leg 5 and down over the pedestal 3 of the pins, loops 32a, b, c, etc. constituting the stitches of a new row. Each succeeding row is formed by repeating the above described operation.

The second embodiment of my invention, illustrated in Figs. 17–31, inclusive, is generally similar to the construction just described, and similar parts have therefore been given the same reference numerals with the suffix a. Referring now to Figs. 17–31, inclusive, the base 1a of the knitting device is preferably formed of sheet metal, the front and back edges thereof being turned down and under to provide supporting flanges 40 and 41, respectively. The knitting pins 2a are fastened to the base 1a along the rear edge thereof by inserting the pedestal portion 3a of the pin through vertically aligned holes 42 and 43 in base 1a and rear flange 41, as best shown in Fig. 28. In this embodiment, I prefer to make each of the pins 2a in one piece by stamping the same from sheet metal having sufficient elasticity to give spring to the inverted U-portion 5a. As in the previously described embodiment, the pedestal portion 3a of the pin is angular in cross-section, forming a trough or recess 4a in its front face, and the sides of said pedestal portion being tapered upwardly, as at 8a. The free leg 7a of the pin is initially bent so that its end is normally concealed in the recess 4a, and is adapted to be flexed out of the recess as will be described hereinafter.

The needle 20a comprises an elongated rod of circular cross-section, and is provided at one end thereof with a finger 21a. The finger 21a preferably consists of a short length of wire wrapped around the needle 20a for several turns in the form of a helix 44 with one end 45 extending at a tangent to the needle. The lead of the helix 44 is equal to the distance between pins 2a, so that when the needle is held against the tops of the knitting pins 2a and rotated to wind the yarn about the needle, as shown in Fig. 31, the helical wire will cause the needle to advance the distance between two pins for each revolution of the needle, and bring the finger 45 between the next pair of pins for picking up the next loop of yarn. A needle rest 46 (see Figs. 25 and 26) can be inserted between any two pins 2a to provide support for the needle, helping to prevent it from sliding off the tops of the pins. The rest 46 is generally rectangular in shape and its width is substantially equal to the length of the pins projecting above the base 1a. Thus, when the rest 46 is inserted between two pins with one long side 50 resting on the base 1a, the other long side 50 of the rest is substantially level with the tops of the pins and affords a broad support for the needle.

This embodiment of my invention further includes a shuttle 51, the function of which is to feed the free end 30 of the yarn under the U-portions 5a of the knitting pins, as shown in Figs. 27 and 28. The shuttle 51 is preferably made up of sheet metal and comprises a flat base portion 52 and a nearly perpendicular back portion 53. The latter is inclined slightly to parallel the tapered portions 8a of the pins 2a when the shuttle is in operating position. It is formed by folding the sheet metal back upon itself and soldering the two thicknesses together along their edges. The sides of the back portion 53 diverge upwardly, forming wedge-shaped blade portions 54 which serve to pry the free legs 7a of the pins out of their recesses 4a and raise the same to allow the shuttle to pass. The two thicknesses of the back portion 53 are spread apart down the center to provide a vertical passageway or conduit 55 through which the yarn can pass, said conduit opening through a hole 56 in the top of the back portion. The lower edge of the folded portion of the back 53 terminates a short distance above the base 52 and is provided with a flange 60 which helps to guide the yarn into the conduit 55. A handle or grip 61 is provided, said grip being in the form of an inverted V having flat mounting flanges 62 which are soldered or otherwise suitably fixed to the base portion 52 of the shuttle.

The operation of this second embodiment of my invention is similar to that previously described, and work is started by winding the yarn around each of the pins successively for the required number of stitches. I have found it convenient to provide a scale on the base 1a of the knitting device, as shown in Fig. 17, for the purpose of speedily determining the number of stitches on the pins without counting each stitch. The shuttle 51, having been previously threaded with the free end of the yarn, is now passed back through the pins 2a, the blades 54 of the shuttle lifting the free legs 7a of the knitting pins 2a out of their recesses 4a to allow the passage of the shuttle. The yarn is fed through the conduit 55 under the U-portions 5a of the knitting pins, and the free legs 7a of the pins spring back into the recesses 4a when the shuttle has passed. The stitches already on the pins are then raised over the concealed ends of the legs 7a. Next, loops 31a, b, c, etc. are progressively formed between each pair of knitting pins 2a by rotating the needle 20a along the tops of the pins, so that the finger 21a picks up the yarn and carries it over the needle, as best illustrated in Fig. 31. When the required number of loops has been formed, the needle is withdrawn, leaving a uniform amount of slack in the yarn between each pair of knitting pins, so that the newly formed stitches will be loose enough to allow of their being pulled down over the enlarged pedestal portions of the pins. The stitches already on the knitting pins 2a are now pulled up over the top of the U-portion of the pins, and the new stitches thus formed are then pushed down the knitting pins 2a to the bases thereof, momentarily springing the legs 7a out of the recesses 4a as they pass. The device is now in readiness for forming the next row of stitches by passing the shuttle back through the knitting pins and repeating the above described operation.

What I claim as my invention and desire to have secured by Letters Patent is set forth in the appended claims.

I claim:

1. A hand knitting device comprising a base, a series of spaced knitting pins disposed along one side of the base, each pin comprising a pedestal having a recess on one side and an inverted U-portion having one leg fixed to the pedestal, the free end thereof being adapted to be pressed into said recess, said base having an anchor strip along the edge thereof opposite the needles, a presser board of a width such that when one side of the presser board is disposed against said anchor strip, the opposite side will bear against the free ends of said pins, whereby when pressure is exerted upon said presser board, said free ends will be pressed into said recesses, and a needle comprising an elongated rod having a finger on one end disposed substantially at right angles thereto.

2. A hand knitting device comprising a base, a series of spaced knitting pins on said base, each pin comprising a pedestal having a recess on one side and a U-portion fixed at one end to the pedestal, the free end of which is adapted to be pressed into said recess, means for pressing the free ends of said U-portions into said recesses, and a needle comprising an elongated rod having a finger on one end disposed at right angles thereto.

3. A hand knitting device comprising a base, a series of spaced knitting pins on said base upon which the stitches of knitting work may be formed, each pin comprising a pedestal having a recess on one side and a U-portion fixed at one end to the pedestal, the free end of which is adapted to be pressed into said recess, and a needle comprising an elongated rod having a finger on one end disposed at right angles thereto for progressively forming loops between each pair of knitting pins.

4. A hand knitting device comprising a base, a series of spaced knitting pins on said base, each pin comprising a pedestal having a recess on one side and a U-portion fixed at one end to said pedestal, the free end of which is adapted to be pressed into said recess, means for pressing the free ends of said U-portions into said recesses, a needle comprising an elongated rod having a finger on one end disposed at right angles thereto, and a vertically positioned standard on each end of said base having a slot in its upper end extending in the direction of the length of the base and in the plane of the knitting pins, said slot being adapted to receive said needle.

5. A hand knitting device comprising a base, a series of spaced knitting pins disposed along one side of the base, each of said pins being in the form of an inverted U, one leg of said pin being provided with a recess and the other leg thereof being normally concealed in said recess, means for feeding yarn under the U-portions of said knitting pins, and means for forming loops in the yarn between each pair of knitting pins.

6. A hand knitting device comprising a base, a series of spaced knitting pins disposed along one side of the base, each of said pins having a pedestal portion fixed to said base, a U-portion, and a flexible free end, said pedestal portion having a recess on one side and said free end being normally concealed within said recess and capable of being sprung out of said recess, shuttle means for lifting the free ends of said knitting pins out of the recesses and feeding yarn under the U-portions, and means for progressively forming loops between each pair of knitting pins.

7. A hand knitting device comprising a base, a series of spaced knitting pins disposed along one side of the base, each of said pins having a pedestal portion fixed to said base, a U-portion, and a flexible free end, said pedestal portion having a recess on one side and said free end being normally concealed within said recess and capable of being sprung out of said recess, a shuttle for feeding yarn under the U-portions of said knitting pins, said shuttle comprising blade portions adapted to pry said free ends out of their recesses as the shuttle is moved along the line of pins, and a conduit portion through which the yarn is fed, the flexible free ends of said knitting pins springing back into their respective recesses when said shuttle has passed, and means for providing a uniform amount of slack in the yarn between each pair of knitting pins.

8. A hand knitting device comprising a base, a plurality of uniformly spaced knitting pins disposed in line along one side of the base, each of said pins having a pedestal portion fixed to said base, a U-portion, and a flexible free end, said pedestal portion having a recess on one side and said free end being normally concealed within said recess and capable of being sprung out of said recess, a shuttle device adapted to be slidably engaged under the free ends of said knitting pins for feeding yarn under the U-portions of the pins, said shuttle comprising a substantially vertically disposed conduit, wedge-shaped blade portions disposed on either side of the conduit for lifting the free ends of the knitting pins out of their recesses as the shuttle passes, and means for sliding said shuttle along the line of knitting pins.

9. A shuttle for use with a hand knitting device of the class described, comprising a base portion and a back portion substantially perpendicular thereto, said back portion consisting of two sheets of metal joined together along the edges thereof to form wedge-shaped blade portions, said two sheets of metal being spaced apart down the center thereof to provide a conduit portion, and means for manually operating the shuttle.

10. For use with a hand knitting device comprising a base and a plurality of uniformly spaced knitting pins disposed in line along one side of the base, a needle comprising an elongated rod, a finger disposed at one end of said rod and substantially at right angles thereto, and means on the rod engageable with said knitting pins for advancing the needle along the line of pins when the rod is rotated.

11. For use with a hand knitting device comprising a base and a plurality of uniformly spaced knitting pins disposed in line along one side of the base, a needle comprising an elongated rod, a wire fixed to one end of said rod and wound thereon in the form of a helix having a lead equal to the distance between two adjacent knitting pins, one end of said wire extending at a tangent to said rod to form a finger, whereby when said helix portion is engaged with the tops of said knitting pins, the latter act to advance the needle along the line of pins when the needle is rotated.

12. A hand knitting device comprising a base, a series of spaced knitting pins on said base upon which the stitches of knitting work may be formed, each pin comprising a pedestal having a recess on one side and a U-portion fixed at one end to the pedestal, said recess being adapted to receive the free end of said U-portion, and a needle comprising an elongated rod having a finger on one end disposed at substantially right angles thereto for progressively forming loops between each pair of knitting pins.

THOMAS B. ADAMS.